455-601 AU 233 EX

FIP8106 OR 3,801,819

United States Patent [19]

Ohnsorge

[11] 3,801,819

[45] Apr. 2, 1974

[54] FIBER OPTIC INFORMATION TRANSMISSION SYSTEM

[76] Inventor: Horst Ohnsorge, Hauptstrasse 37, D-7901 Erstetten, Germany

[22] Filed: Sept. 8, 1972

[21] Appl. No.: 287,263

[30] Foreign Application Priority Data

Sept. 8, 1971 Germany ............................ 2144780

[52] U.S. Cl. ................................................ 250/199
[51] Int. Cl. ................................................ H04b 9/00
[58] Field of Search ...................... 250/199; 325/13; 179/15 AD

[56] References Cited

UNITED STATES PATENTS

| | | | |
|---|---|---|---|
| 3,633,035 | 1/1972 | Uchida | 250/199 |
| 3,118,111 | 1/1964 | Miller | 325/13 |
| 2,942,196 | 6/1960 | De Lange | 179/15 AD |

FOREIGN PATENTS OR APPLICATIONS

| | | | |
|---|---|---|---|
| 1,202,418 | 8/1970 | Great Britain | 250/199 |

*Primary Examiner*—Albert J. Mayer
*Attorney, Agent, or Firm*—Spencer & Kaye

[57] ABSTRACT

In the transmission of data by conducting laser beams through individual light conducting glass fibers, the several transmitted beams are kept at a sufficient amplitude and in phase with one another by being periodically interrupted and regenerated simultaneously by the same control pulse.

6 Claims, 5 Drawing Figures

FIBER OPTIC INFORMATION TRANSMISSION SYSTEM

BACKGROUND OF THE INVENTION

The present invention relates to a data transmission system including a laser, a glass fiber conductor and a photodetector, of the general type disclosed in German Patent No. 1,254,513.

Economic considerations favor the use of light intensity modulation for transmission of information through a light conducting glass fiber. Although the transmission of many G-bits (gigabits = $10^9$ bits) per second through a glass fiber is conceivable, it will probably not be possible in the near future to transmit more than about 1 –2 G-bits per second through a laser/glass fiber system since at higher pulse rates the electronic connections and the output capability of the laser are exceeded. Since the transmission of a television signal without the use of bandwidth reduction requires a capacity of about 70–80 M-bits (megabits) per second, there would result a transmission capacity of about 20 television signals for every individual glass fiber.

If a higher transmission capacity is to be provided, it is necessary to simultaneously operate a plurality of light conductors. In particular, if transmission signals are to be provided for video telephones, there arises the necessity of using cables with numerous light conductors, e.g. several hundred glass fibers. A significant factor in considering the practical introduction of such systems is the cost of the required intermediate amplifiers and the associated apparatus for the necessary pulse regeneration.

SUMMARY OF THE INVENTION

It is an object of the present invention to provide a system which can accomplish pulse regeneration and amplification in a relatively simple and inexpensive manner.

The present invention is carried out by feeding the information carrying pulses into all of the light conductors of the cable or into a portion of the light conductors of the cable in fixed phase relationship to one another. Thus the transmission simultaneously employs space multiplex and time multiplex, when time multiplex transmission is carried out in the individual light conductors.

One advantage of the present invention is that with rigorously fixed phase feeding of the parallel time multiplex channels the clock pulse can be regenerated relatively easily and economically.

DESCRIPTION OF THE PREFERRED EMBODIMENTS

Figure 1:
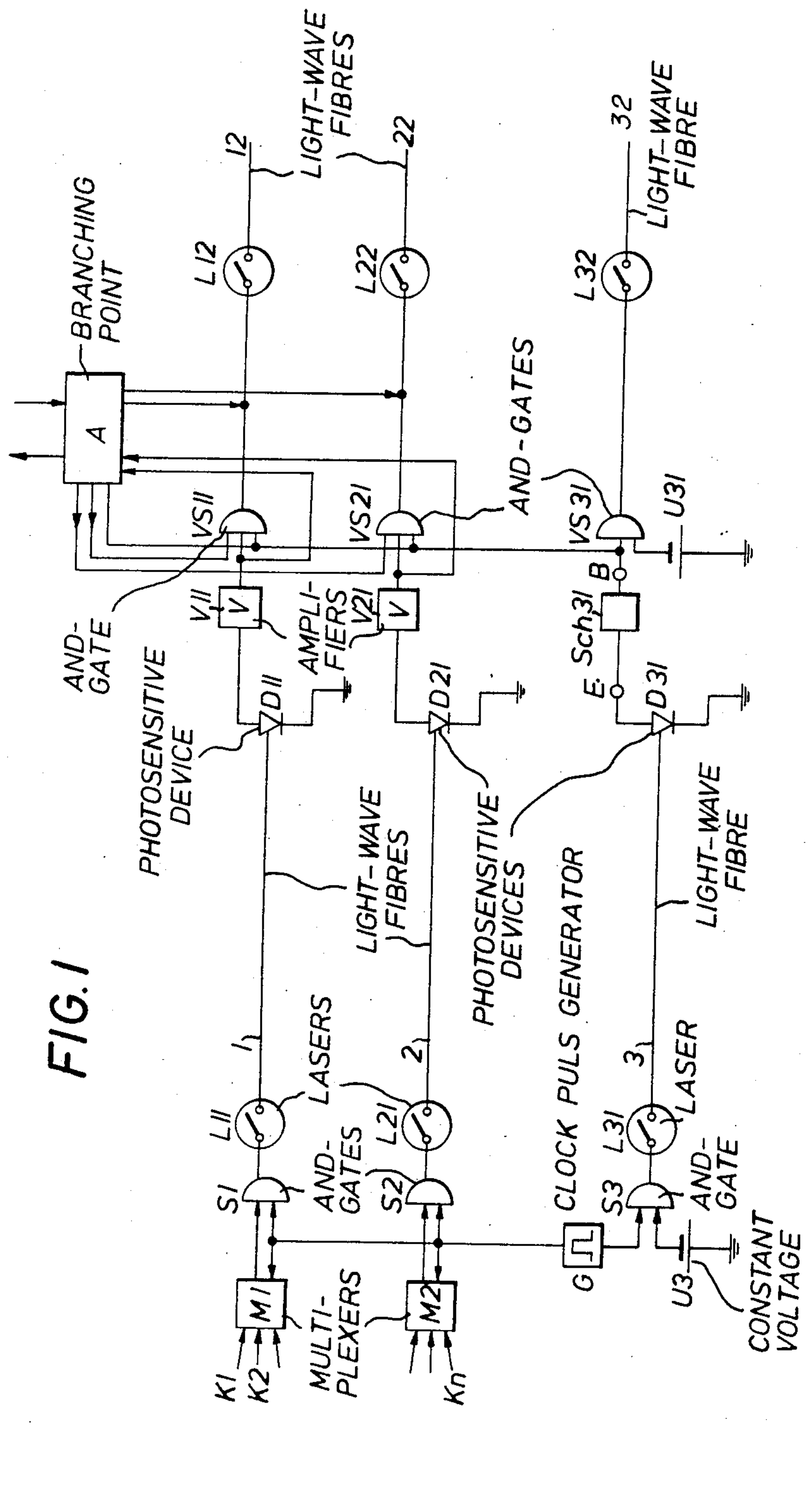
FIG. 1 is a basic circuit diagram of a communication system according to the present invention.

FIG. 1 schematically shows a system in which a plurality of light conductors of the cable (for reasons of simplicity only light conductors 1 and 2 are illustrated in the drawing) serve for the transmission of the actual information while a further light conductor 3 serves for the transmission of control or clock signals. The communication signals K1, K2, . . . . Kn which are being transmitted are fed to a multiplexer M1 or M2 after the information has been converted from analog to digital form, if such conversion is necessary. A clock pulse generator G synchronizes the output pulses of the multiplexer so that they are transmitted only at predetermined clock pulse instants, thus keeping the output of the multiplexers in rigid phase synchronization. These output pulses travel through an AND gate S1 or S2 to a laser L11 or L21, respectively, which converts the electrical pulses into light pulses and transmits them through light conductors 1 and 2. In an intermediate amplifier V11 or V21 the light pulses are received by a photosensitive diode D11 or D21, respectively, which may be an avalanche diode for example. The signals are reconverted to electrical pulses and then amplified.

In the same manner the clock pulse is transmitted through light conductor 3. The clock pulse generator also controls a laser L31 via an AND gate switch S3 whose other input is connected to a fixed bias voltage U3. The clock pulses also are reconverted to an electrical signal by a diode D31. A threshold value circuit Sch31 defines the exact clock pulse time. The output of the threshold value circuit Sch31 is connected with an amplifier VS31 whose output controls a laser L32. Amplified clock pulses thereby are transmitted to the next intermediate amplifier station via the glass fiber 32. The output of the threshold value circuit Sch31 is also connected to amplifiers VS11 and VS21, which amplify the information signals coming through light conductors 1 and 2 after they have been amplified, if required, in amplifier V11 or V21, respectively. The amplified signals from amplifiers VS11 and VS21 control lasers L12 or L22, respectively.

The amplifiers VS11, VS21 and VS31 are designed as AND gates. In order to obtain amplification with minimum distortion or loss of the information pulses care must be taken that the clock pulses coming from the threshold value circuit Sch31 as well as the information pulses arrive simultaneously at the amplifiers VS11 and VS21 which are provided for the amplification of the information.

If the different light conductors of the cable have different propagation periods due to slight differences in their lengths, it is therefore necessary to compensate for these differences in the propagation periods. This can be accomplished either in that during the first operation of the arrangement the individual glass fibers are all made the same length or the differences in the propagation periods are compensated for by the use of different additional delays in the signal path. The compensation can also be accomplished by feeding the clock pulses furnished by threshold value circuit Sch31 to the individual amplifiers VS11 and VS21 with different delays.

A branching point A is provided in the intermediate amplifier which permits selected data segments to be cut out before reaching amplifiers VS11, VS21 and simultaneously to prevent transmission of these segments to the lasers L12 or L22, respectively, by suitable control of the AND gates VS11 and VS21. Other data can be inserted via device A in the time slots of the suppressed data. Device A permits the cutting out or cutting in of either individual signals or even a plurality of signals at any one time.

Figures 3, 4, 5:
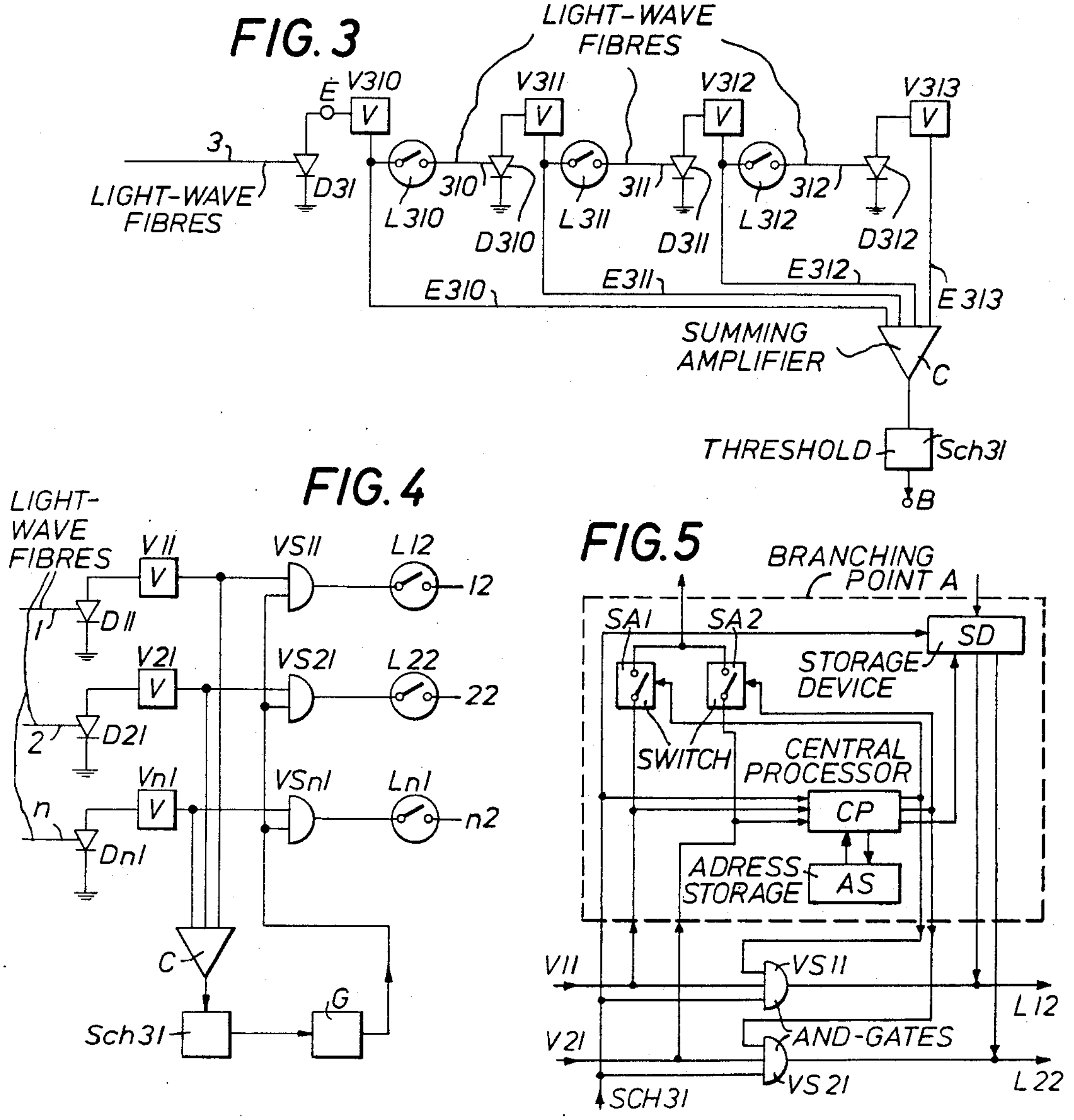
FIG. 3 is a block circuit diagram of another embodiment of a clock pulse regeneration device according to the invention.
FIG. 4 is a block circuit diagram of a further clock pulse regeneration device according to the invention.
FIG. 5 is a block circuit diagram of one embodiment of the branching point A according to FIG. 1.

FIG. 5 shows a block circuit diagram of one embodiment of the device A. The following description is made for the first transmission path only, as example.

The branching point A consists of a central processor CP as usually embodied in most digital computers and an address storage device AS. The whole information coming from the amplifier V11 is given to the central processor CP which at the same time receives clock pulses from Sch 31.

The central processor compares the incoming addresses with those stored in the address storage device AS and decides whether an information in one of the time slots of the channel VS 11 has to be led out of this channel or to the laser diode L12.

If the information of a time slot has to be led out of the branching point A, the switch SA1 is closed and vice versa. Thus it is possible to transmit information via the transmission parts.

If the switch SA1 is closed which means that a signal is allowed to pass this switch, the central processor CP stops the flow of information to L 12 via VS 11.

The second task of the central processor is to give incoming information signals reaching the branching point A into the transmission parts L12.

For this sake, a storage device SD takes the incoming information signals. The central processor allows this storage device to pass its information to the transmission parts L12 (L22,) wherever it discovers a free time slot. This transfer is controlled by the clock pulse from Sch 31, too.

Figure 2:
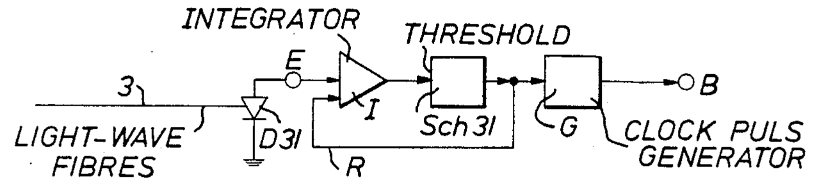
FIG. 2 is a block circuit diagram of one embodiment of a clock pulse regeneration device according to the invention.

In FIG. 1 a simple threshold value circuit Sch31 is provided for the pulse regeneration, which is connected between points E and B before the clock pulse amplifier VS31. For longer lines it may be necessary to use other methods for clock puise regeneration. FIGS. 2, 3 and 4 show several other embodiments for synchronizing the pulses during pulse regeneration.

FIG. 2 shows an integrator I, a threshold value circuit Sch31 and a clock pulse generator G, all connected in series. A plurality of control signals, or clock pulses, arriving in succession at input E are summed in the integrator I. The integrator I is designed with sufficiently long decay time constant so that there is only an insignificant decay of the summed signal between each of the received pulses. Summation of the signal therefore is possible by use of the integrator. Only after a plurality of clock pulses have arrived is the threshold value of the threshold value circuit Sch31 exceeded. When the threshold value is exceeded, the integrator is reset to zero by the feedback line R. The output pulse of the threshold value circuit synchronizes the free-running clock pulse generator G so that it is in phase with the arriving pulses. The phase adjustment here occurs periodically after a given number of clock pulses. The regenerated clock pulse is available at output B of the circuit.

FIG. 3 shows another embodiment for synchronizing the clock pulse regeneration from the control signal.

The output signal of the photosensitive diode D31 is fed, via an amplifier V310 to a laser L310 which feeds a light conductor 310 of a predetermined length. The output signal also is transmitted along electric line E310 directly to the input of a summing amplifier C. A second and third laser L311 and L312 respond to the light pulse emitted by laser L310 after a delay determined by the length of the respective light conductors 311 and 312 between the individual lasers and associated diodes D311 and D312. The lengths of the individual light conductors are so dimensioned that their delay time exactly corresponds to the spacing of the individual clock pulses. The four pulses from the outputs of amplifiers V310, V311, V312 and V313 are fed to the summing amplifier C via lines E310 to E313 and are added by the summing amplifier C. The output signal of amplifier C is fed to the threshold value circuit Sch31 whose signal at output B constitutes the desired clock pulse, thus eliminating slight fluctuations in time.

With the fixed phase feeding of the parallel time multiplex signals it is also possible to regenerate the clock pulse relatively easily from the sum of the pulses of these signals even without a special clock pulse signal by utilizing a method of pulse summing as is shown in the embodiment illustrated in FIG. 4. Here the light pulses arriving on the individual light conductors 1, 2, . . . .*n*, which are serving as the information transmission lines, are again converted into electrical pulses via diodes. If required, the pulses are amplified in amplifiers V11 . . . . V*n*1, then they are simultaneously fed to a summing amplifier C which controls a threshold value circuit Sc*h*31. The threshold value circuit synchronizes a clock pulse generator G which controls the AND gates VS11 . . . . V*n*1, connected ahead of the individual lasers L12 . . . L*n*2 as shown in FIG. 4, at the clock pulse instants. The method described in connection with FIG. 4 requires, however, that a travel time equalization of the individual information pulses be accomplished prior to the summation by amplifier C since this travel time equalization cannot be carried out by delaying the clock pulses as done in the arrangement of FIG. 1. This equalization of travel time can be accomplished either by well known delay time filters (all-pass filters) or by cutting off the light conductors in the appropriate length before they are connected to the avalanche diodes D11 (D21, D31,. . .). The last method is very easily performed since pieces of light conductors (glass fibers) may be inserted into a line of glass fibers by simple connectors.

In this case all pulses passing the laser diodes L 12 (L22, . . .) have exactly the same phase and not only a constant phase relation compared with the other embodiments of the invention described above. The arrangement according to FIG. 4 further requires that a certain minimum number n of photoconductors be provided so that even when several photoconductors are temporarily not in operation, the threshold value circuit Sch31 always operates with sufficient dependability.

As discussed above, all of the light conductors of a cable are operated in a fixed phase relationship to one another; it is also possible, however, to divide a cable having a plurality of photoconductors into several bundles, the fixed phase relationship then applying only for each of the individual bundles.

It will be understood that the above description of the present invention is susceptible to various modifications, changes and adaptations, and the same are intended to be comprehended within the meaning and range of equivalents of the appended claims.

I claim:

1. In a circuit arrangement for the transmission of information through a cable having parallel-directed glass fiber light conductors which are each fed by a respective semiconductor laser, controlled by an information source, with light pulses carrying the information to be transmitted, each of the light conductors being constituted by a series of sections, and the circuit arrangement including pulse regeneration means connected between successive sections of each of the light conductors, the improvement comprising means operatively associated with said pulse regeneration means for feeding the information carrying pulses through at least a portion of the light conductors in the cable in a fixed phase relationship to one another.

2. Circuit arrangement as defined in claim 1 wherein said means comprises means for summing the incoming pulses of at least a portion of the light conductors and means connected to said summing means for producing a clock pulse from the summed pulses.

3. Circuit arrangement as defined in claim 1 wherein said means comprise means for generating control signals for the purpose of assisting in pulse regeneration and wherein at least one light conductor in the cable is connected to said generating means to transmit the control signals.

4. Circuit arrangement as defined in claim 3 wherein said means for generating control signals comprise means for producing clock pulses from the control signals at the pulse and clock pulse regeneration points.

5. Circuit arrangement as defined in claim 4 wherein said means for producing the clock pulses comprise, connected in series, an integrator, one input of which receives the control signals, a threshold value circuit, and a clock pulse generator which is synchronized by said threshold value circuit; and feedback means connected from the output of said threshold value circuit to a reset input of said integrator for resetting the integrator to zero after a certain number of clock pulses.

6. Circuit arrangement as defined in claim 4 wherein said means for producing the clock pulses comprise: a plurality of clock pulse delay stages, each stage including an amplifier with a subsequently connected laser diode and a glass fiber light conductor; a summing amplifier; means connecting the outputs of the individual amplifiers to said summing amplifier, and means connecting the output of the summing amplifier to a threshold value circuit which produces the regenerated clock pulse at its output.

* * * * *

UNITED STATES PATENT OFFICE
CERTIFICATE OF CORRECTION

Patent No. 3,801,819 Dated April 2nd, 1974

Inventor(s) Horst Ohnsorge

It is certified that error appears in the above-identified patent and that said Letters Patent are hereby corrected as shown below:

In the heading of the patent, after line 4, insert

--[73] Assignee: LICENTIA Patent-Verwaltungs-GmbH
Frankfurt am Main, Germany--.

Signed and sealed this 1st day of October 1974.

(SEAL)
Attest:

McCOY M. GIBSON JR.
Attesting Officer

C. MARSHALL DANN
Commissioner of Patents